(12) United States Patent
Perentes et al.

(10) Patent No.: US 9,392,902 B2
(45) Date of Patent: Jul. 19, 2016

(54) CAPSULE SENSING SYSTEM

(75) Inventors: Alexandre Perentes, Lausanne (CH); Alfred Yoakim, St-Legier-la Chiesaz (CH); Youcef Ait Bouziad, Saint-Sulpice (CH)

(73) Assignee: Nestec S.A., Vevey (CH)

( * ) Notice: Subject to any disclaimer, the term of this patent is extended or adjusted under 35 U.S.C. 154(b) by 692 days.

(21) Appl. No.: 13/806,288

(22) PCT Filed: Jun. 23, 2011

(86) PCT No.: PCT/EP2011/060544
§ 371 (c)(1),
(2), (4) Date: Dec. 21, 2012

(87) PCT Pub. No.: WO2012/000878
PCT Pub. Date: Jan. 5, 2012

(65) Prior Publication Data
US 2013/0099597 A1    Apr. 25, 2013

(30) Foreign Application Priority Data

Jun. 28, 2010   (EP) .................................. 10167463

(51) Int. Cl.
| A47J 31/06 | (2006.01) |
| A47J 31/44 | (2006.01) |
| A47J 31/52 | (2006.01) |
| B65D 85/804 | (2006.01) |
| H01H 35/00 | (2006.01) |

(52) U.S. Cl.
CPC .............. *A47J 31/44* (2013.01); *A47J 31/4492* (2013.01); *A47J 31/52* (2013.01); *B65D 85/8043* (2013.01); *H01H 35/00* (2013.01); *Y10T 307/766* (2015.04)

(58) Field of Classification Search
USPC .............................................. 307/116; 99/295
See application file for complete search history.

(56) References Cited

U.S. PATENT DOCUMENTS

| 2007/0000906 A1* | 1/2007 | Kaastra ......................... 219/441 |
| 2007/0186672 A1* | 8/2007 | Friedberger et al. ............ 73/802 |
| 2008/0121111 A1 | 5/2008 | Paget et al. |

FOREIGN PATENT DOCUMENTS

| EP | 0455337 | 11/1991 |
| JP | 05097166 | 4/1993 |
| WO | 2005063091 | 7/2005 |
| WO | 2010092543 | 8/2010 |

OTHER PUBLICATIONS

Japanese Office Action for Application No. P2013-517202, Dispatch No. 279481, dated Jun. 23, 2015, 7 pages.

* cited by examiner

*Primary Examiner* — Danny Nguyen
(74) *Attorney, Agent, or Firm* — K&L Gates LLP

(57) ABSTRACT

A brewing unit (1) of a beverage preparation machine has: a seat (11) for receiving a capsule (2) having an electrically conductive material (21, 22, 23, 24); and a capsule sensing electric circuit with first and second electric connectors (A, B). The first electric connector (A) and the second electric connector (B) are electrically connected through the electrically conductive material of the capsule (2) when the capsule is present in the seat (11) and electrically disconnected when the capsule is not in the seat so as to close and interrupt, respectively, the capsule sensing electric circuit (A, Aa, a, B, Bb, b, abc).

16 Claims, 2 Drawing Sheets

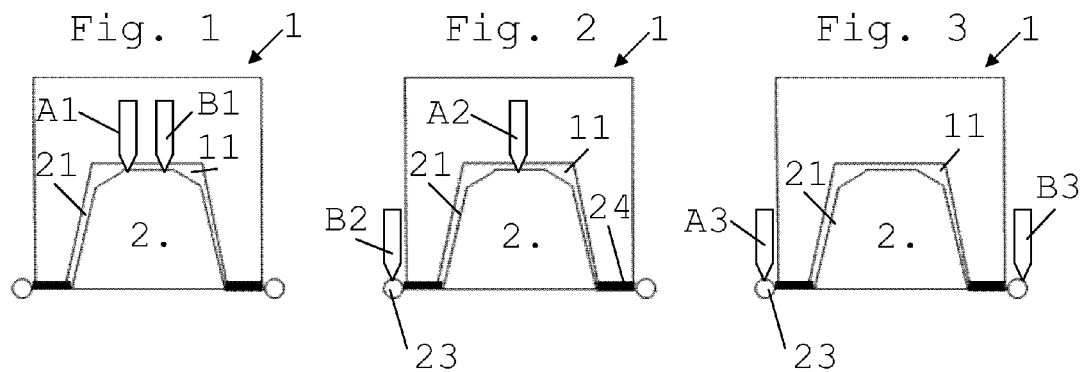
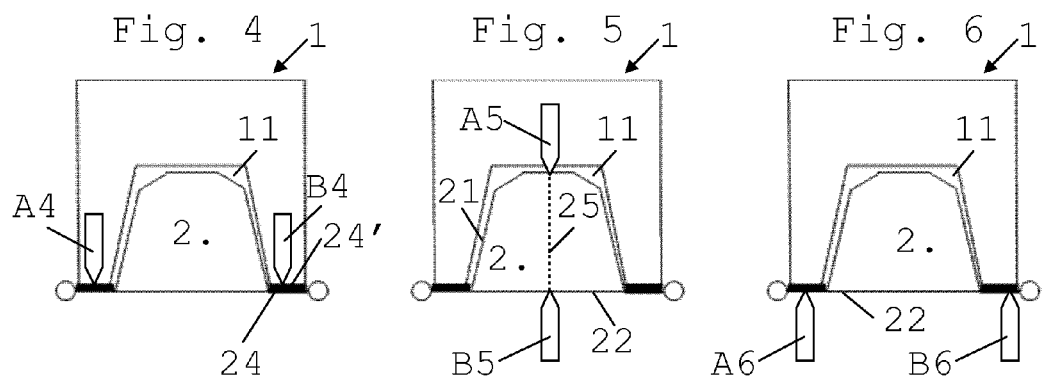
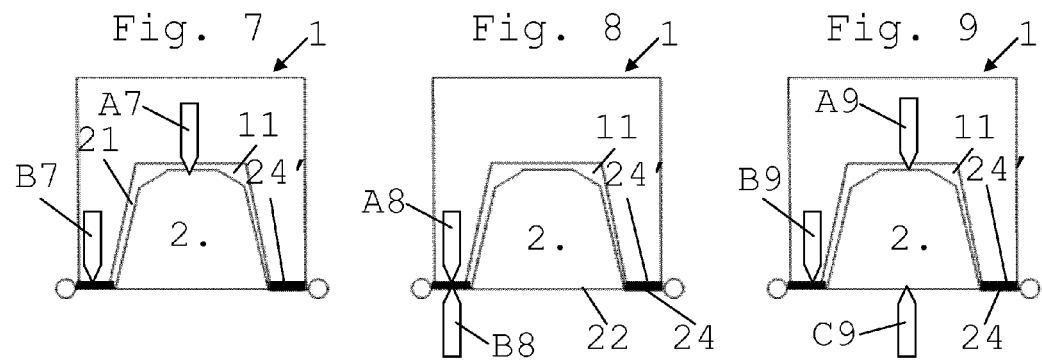

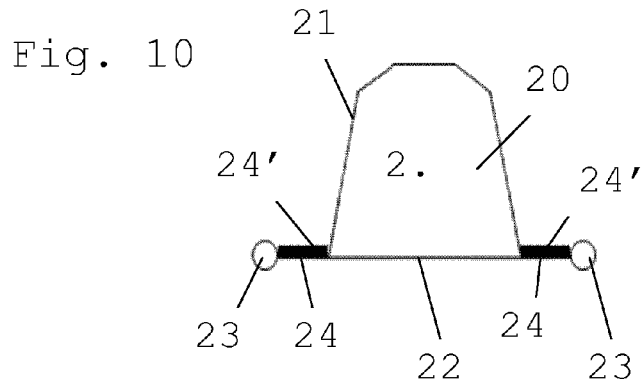
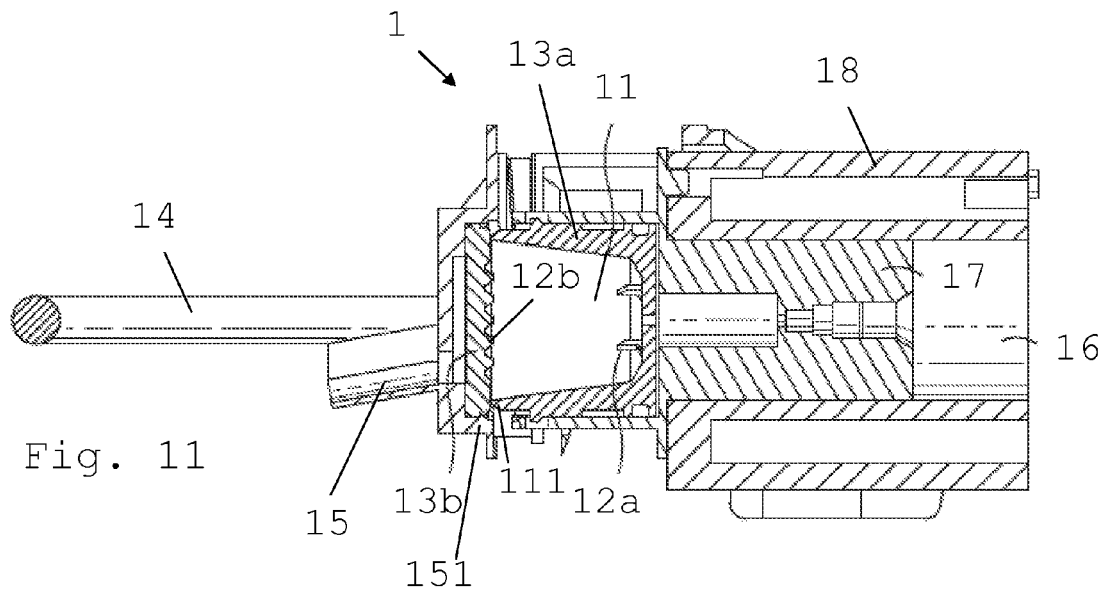
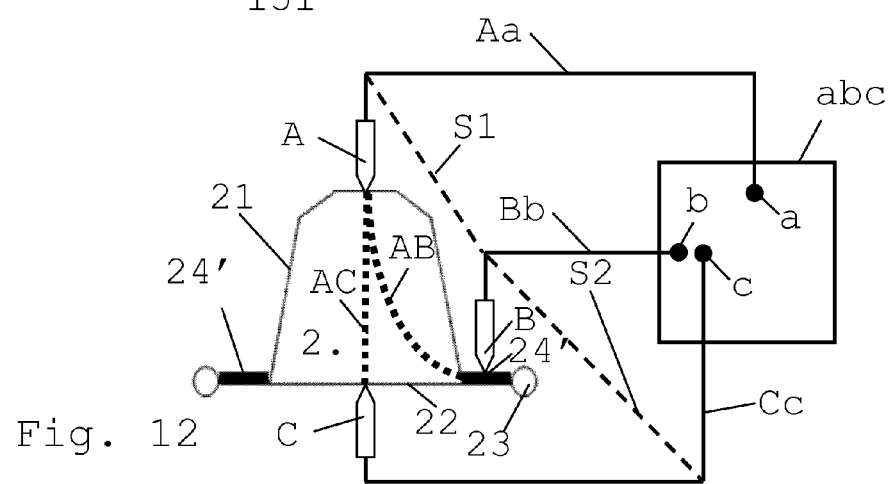

CAPSULE SENSING SYSTEM

CROSS REFERENCE TO RELATED APPLICATIONS

The present application is a National Stage of International Application No. PCT/EP2011/060544, filed on Jun. 23, 2011, which claims priority to European Patent Application No. 10167463.8, filed Jun. 28, 2010, the entire contents of which are being incorporated herein by reference.

FIELD OF THE INVENTION

The field of the invention relates to a sensing system for a capsule within in a beverage preparation machine.

For the purpose of the present description, a "beverage" is meant to include any human-consumable liquid substance, such as tea, coffee, hot or cold chocolate, milk, soup, baby food, etc. A "capsule" is meant to designated a packaging for enclosing any pre-portioned beverage ingredient. Unless specified, the packaging is of any material and any structure, in particular an airtight packaging, e.g. plastic, aluminium, recyclable and/or biodegradable packagings, and of any shape and structure, including soft pods or rigid cartridges containing the ingredient.

BACKGROUND ART

Electrically powered systems for preparing beverages, in particular hot beverages such as tea or coffee, including such beverages that are prepared using portioned ingredients for instance contained in capsules or pods, have been developed and have become very popular, for use at home as well as out of home.

The numerous advantages of such systems have been widely recognized, in particular, their convenience of use, clean operations and better controlled quality of the brewed beverage delivered.

It is known to associate a radio frequency (RF) identifier to the capsule for the purpose of recognizing the capsule which is inserted in the device such as by a reader. Such identification allows changing particular operations, in the beverage producing device, in response to the detection of the identifier. For instance, brewing operations can be modified accordingly for adapting them to the type of capsule detected. For instance, brewing parameters, such as water temperature, the beverage volume or others, can be changed.

FR 2 912 124 relates to a portioned package for preparation of a beverage comprising two flexible walls connected by their seam and comprising an RFID tag for contactless reading which is positioned in a reinforced peripheral portion at the seam of the package. EP 1 890 271 relates to a method of controlling the dispensing of an infusion product with a container for a product dose and an RFID tag associated to a respective number of containers. GB 2 397 510 relates to a cartridge and machine for the preparation of beverage wherein each cartridge carries a code comprising a plurality of data bits which barcode is read by a beverage preparation machine upon insertion of the cartridge in the machine.

WO 2005/044067 relates to an apparatus enabling the traceability of the content of a receptacle and its origin wherein the receptacle comprises an optical or magnetic code containing information as to the content or origin of the receptacle which are read by an external reader, e.g., comprising a magnetic head. The code can be a metallic wire or ribbon containing recorded information in magnetic format.

Other systems has been developed which involve the use of optical recognition, e.g. of bar codes or other visual identifiers on capsules, as for example disclosed in WO02/28241 and GB 2 397 510.

Such prior art capsule recognition systems involve the use of complicated and/or expensive emitters and sensors. These sensing systems, particularly involving optical recognition, are likely to be exposed to interferences (insufficiently clean environment) and/or mis-positioning affecting the reliability of the sensing. Such delicate sensing devices are located in harsh environments, such as brewing unit, and thus exposed to high temperature and pressure likely to cause premature failure of such devices.

There is therefore still a need to simplify and/or reduce the costs involved with the sensing of capsules used in beverage preparation machines while providing a reliable sensing system.

SUMMARY OF THE INVENTION

The invention relates to a brewing unit of a machine for preparing a beverage. The brewing unit has: a seat for holding a capsule in a beverage preparation configuration, the capsule comprising an electrically conductive material; and a capsule sensing electric circuit with first and second electric connectors.

For instance, the brewing unit is configured for a machine for preparing coffee, tea, chocolate or soup. In particular, the machine is arranged for preparing within a beverage module a beverage by passing hot or cold water or another liquid through the capsule held by the brewing unit. The capsule typically forms a packaging that delimits an inner cavity for containing an ingredient of the beverage to be prepared, such as ground coffee or tea or chocolate or cacao or milk powder. Hence, an ingredient used for the beverage preparation can be introduced into the machine in a pre-portioned form with the aid of a capsule, i.e. a packaging for holding and containing the ingredient.

In accordance with the invention, the first electric connector and the second electric connector are:

electrically connected through the electrically conductive material of the capsule when the capsule is present in the seat; and electrically disconnected when no such capsule is in the seat and/or when the seat is in a configuration for receiving and/or evacuating a capsule, so as to close and interrupt, respectively, the capsule sensing electric circuit.

Hence, by monitoring the electric behaviour of this electric circuit, the electric relationship between the first and circuit's electric conductors may be analysed and the characteristics of the electric path between the connectors analysed. When a conductive capsule bearing such an electric path is present in the seat of the brewing unit the electric characteristics of the circuit are different to circuit's electric characteristics when the capsule is absent.

It follows that invention provides an inexpensive and reliable and robust sensing system in a brewing unit for beverage preparation machines using capsules and whose electric contacts for sensing a capsule are simple to implement in the brewing unit configurations known in the art.

The sensing system of the invention is in particular nearly unaffected by the cleanness of the environment, in particular when the electric contacts are located in an area that is not at all exposed to liquids in particular to beverage prepared by the brewing unit. Moreover, unlike optical recognition, the sensing system is generally not affected by any orientation of the capsule or deformation thereof or light interferences in so far as the orientation of the capsule is predetermined by the configuration of the capsule seat. An capsule type based discrimination of the capsules is easily achieved in an inexpensive and reliable manner by providing type dependant electric characteristics, such as type dependant resistivity, of the capsule that can be measured by the capsule sensing electric circuit.

This simple capsule sensing system may be used for instance in an automatic capsule recognition and machine parameterisation process. For instance, the machine may be pre-programmed for carrying out different beverage preparation processes depending on the type of capsules used, e.g. a capsule containing ground coffee for preparing an espresso that can be differentiated by the system from a capsule containing ground coffee for preparing a regular or lungo coffee. Hence, the quantity of water and/or heating and/or pumping pressure may be controlled automatically based on the sensing system. In order for the machine to discriminate automatically between the capsules, the capsules of one type have electrical properties that are different from the electrical properties of another type and such differences of properties can be sensed by the circuit.

The simple capsule sensing system can be used for capsule detection, namely for detecting the presence or the absence of a capsule in the seat of the brewing unit, for instance to control the status of the machine, in particular its energy consumption as appropriate. Hence, when the machine detects no capsule in the seat, a thermal conditioner such as a heater in particular an accumulation heater e.g. a thermoblock, may be shut down or run down to an lower energy consumption level to save energy. Likewise, an energy-consuming user-interface, e.g. a user-signalling LED, an interface screen, a touch screen and/or a illuminated button may be shut-off in the absence of a capsule in the seat. The absence of an ingredient capsule in the seat may also be used to authorise a service mode, e.g. for cleaning and/or descaling the machine, etc.

It follows that the capsule sensing arrangement can be used to increase the user convenience by automatically recognising the type of capsule used in the brewing unit and automatically carry out type-dedicated operations. Moreover, the sensing arrangement may be used to reduce the energy consumption and lower the carbon footprint of a beverage preparation machine during its lifetime.

A first level of recognition may be linked to a pre-programmed beverage preparation process adjusted to the capsule type, e.g. a capsule for preparing an espresso or a lungo or a regular coffee. A second level of recognition may be linked to the identification of the content of the capsule, e.g. a particular coffee blend, and will allow the machine to communicate to the user information about the particular ingredient content e.g. via an interface screen, such as information as to the composition and origin and context of the ingredient content.

For instance, the electric circuit comprises a module for:
detecting a presence of the capsule in the seat by sensing a voltage and/or a current circulating between the first and second electric connectors; and/or
recognising a capsule type from a plurality of different types of capsules by measuring a type-dependant electric characteristic, such as an impedance, of the capsule when present in the seat and electrically connected to the first and second electric connectors.

This module may include a processor or like controller and a sensor connected thereto for sensing a characteristic of the electric circuit when powered. For instance, the sensor may include an ammeter for sensing whether or not current may pass between the first and second connectors whereby the presence and/or the resistivity of a capsule in the seat may be derived. Likewise, the sensor may include a voltmeter for sensing the magnitude of a voltage drop between the first and second connectors. It is also possible to analyse the capacitive or inductive properties of a capsule in the seat by passing a non-constant, e.g. a sinusoidal electrical power component, in the circuit. Hence, the impedance or other electric characteristic, e.g. involving the use of non-linear or active electric components in the capsule, may be used to detect the presence of a capsule in the seat and/or to identify a capsule type selected from a plurality of types.

In one embodiment, the electric circuit comprises a third electric connector which is electrically connectable to the first electric connector through an electric path in the electrically conductive material of the capsule that is different to an electric path in the electrically conductive material connecting the first and second electric connectors. The use of further electric connectors is also contemplated. The different connectors may be associated with different electric paths in the capsule having dedicated sensing functions, in particular for: identifying the presence or absence of the capsule; the type of capsule; a sub-type of a capsule or an indication about its age, e.g. to check whether the capsule is still safe for consumption.

At least one of the electric connectors can be arranged to contact, particularly non-intrusively, a capsule surface made of the electrically conductive material of the capsule when present in the seat and to circulate an electric current therethrough. Hence, this surface of the capsule should be electrically non-insulated. The capsule may be made of electrically conductive material or may bear a conductive surface layer, e.g. a conductive paint.

At least one of the electric connectors can be arranged to pierce a capsule surface, in particular a non-conductive surface, to come into contact with the electrically conductive material of the capsule underneath its surface, when the capsule is present in the seat, and to circulate an electric current through the capsule's conductive material. In this case, the capsule may or may not be covered with an electrically insulating material, e.g. an insulating paint.

The brewing unit may have a first enclosing part and a second enclosing part delimiting a capsule chamber that forms the seat. In particular, the enclosing parts are movable apart for inserting the capsule into the seat and/or removing the capsule from the seat and are movable together to hold the capsule in the seat for beverage preparation from the capsule. Examples of brewing units with such first and second enclosing parts can be found in EP 1 646 305, EP 1 859 713, EP 1 859 714 and WO 2009/043630.

The first and/or the second enclosing part(s) may form and/or bear one or more of the circuit's electric connectors.

The first and second enclosing parts can be configured to be movable together so as to squeeze therebetween an electrically conductive portion, such as a tongue or peripheral flange, e.g. a rim, of the capsule when said capsule is present in the seat. At least one of the electric connectors may be mounted in and/or adjacent one of the enclosing parts adjacent the squeezed portion, e.g. adjacent a portion extending outside the seat.

First and second electric connectors can be arranged to:
electrically contact each other in the absence of any capsule in the seat that is in a capsule extraction configuration, e.g. when the above enclosing parts are moved together in the absence of any capsule in the seat; and
be out of electrical contact when the seat is in a capsule receiving and/or evacuation configuration, e.g. when the above enclosing parts are spaced apart.

Hence, in addition to detecting the presence and absence of a capsule in the seat, it is also possible to detect whether the seat is in an open configuration for receiving and/or evacuating a capsule or in a closed configuration for circulating liquid through the seat. In the former configuration, circulation of liquid through the seat (e.g. by operating a pump) may be prevented. In the latter configuration, liquid circulation may be allowed either for servicing purposes (in particular when no capsule is in the closed seat) or for preparing a beverage (in particular when a capsule is detected in the closed seat).

In one embodiment, the seat comprises a capsule piercer, such as at least one piercing element selected from a pin, needle, cone, pyramid and blade or a surface forming a series of such piercing elements e.g. a pyramid plate. Such a piercer is typically used to open the capsule for the introduction of liquid therein, e.g. water, or the removal of liquid therefrom, e.g. the beverage. Examples of such capsule piercers can be found in EP 512 470, EP 1 299 022 and EP 1 339 305.

The capsule piercer may form one of the electric connectors which is arranged to be in contact with an electrically conductive portion of the capsule, when present in the seat and in particular when pierced by the piercer, and to circulate an electric current therethrough.

When a capsule piercer is used as a connector, the outer surface of the capsule adjacent to the piercer does not need to be electrically conductive but may be covered with an insulating layer such as a colour paint. Electrical conduct is thus achieved by penetration of the piercer through the insulating surface into the conductive material underneath.

The invention also relates to a method of operating the above described brewing unit. The method includes the powering of the electric circuit and the measuring of at least one electric characteristic, such as a circulating current and/or a voltage drop between the first and second electric connectors (A,B). From this measuring, the following may be deriving:

a presence or an absence in the seat of a capsule that comprises an electrically conductive material connected to and inter-connecting the connectors by forming therebetween an electrically conducting path; and a capsule type selected from a plurality of different types of capsules comprising an electrically conductive material having a type-dependant electric characteristic, such as an impedance, measurable by the electric circuit when a capsule of one of such types is present in the seat.

Another aspect of the invention relates to a use of a capsule having an electrically conductive material for connecting electrically the electric connectors of a brewing unit as described above, when this capsule is held in the seat. For instance the seat forms a housing arranged for housing the capsule.

The electrically conductive material may be metallic, e.g. containing aluminium, copper, iron, etc. . . . or may be a conductive ceramic or organic material, e.g. a conductive paint or plastic material.

The capsule can be made of a structure consisting predominantly of the electrically conductive material, in particular wherein at least 60 wt %, such as at least 75 wt %, optionally at least 95 wt % of the capsule. For instance, the capsule is made of a metallic packaging, e.g. an aluminium-based packaging, with or without an insulating outer layer for protecting the structure and/or for visual recognition reasons.

The invention also relates to a capsule for a brewing unit as described above. The capsule has: a non-conductive structure; and a track made of the electrically conductive material supported by the structure for electrically connecting the first and second electric connectors.

Another aspect of the invention relates to a set of capsules for a brewing unit as described above. The capsules comprise an electrically conductive material and differ from each other by at least one electric characteristic, such as the impedance, of the electrically conductive material of each capsule. Hence, the capsules may be sensed by the electric circuit, for example to distinguish the capsules and/or to detect whether or not a capsule is present in the brewing unit.

A further aspect of the invention relates to method of deactivating an electric circuit of a brewing unit as described above. The method comprises electrically connecting the electric connectors with a by-pass. The by-pass may be integrated in the electric circuit, physically and/or by programming a control unit of the circuit thereof. Hence, the same brewing unit may be used in machines which are arranged to be operated with capsules that can be sensed by the circuit and in machines which are not intended to provide such a feature. The presence of a capsule in the seat may thus be simulated by the by-pass so that the brewing machine may operate whether or not a capsule is used that is designed for being sensed by the electric circuit.

Yet a further aspect of the invention relates to the use of an electrically conductive conductor as a by-pass for the above method. The conductor is for instance arranged to extend along a peripheral part of the seat so as to leave sufficient room in the seat for inserting a separate capsule. Hence, such a separate capsule does not require to interconnect the electric connectors to allow proper operation of the brewing unit.

A low electric power can be sufficient to sense capsule in the seat. For instance, a voltage drop between the electric connectors of 0.1 to 12 volt can be provided, in particular 1 to 10 volt such as 2.5 to 7.5 volt. The current circulating between the electric connectors in the capsule can be of the order of 0.01 to 50 mA, in particular from 0.1 to 5 mA such as 0.3 to 1 mA. However, it is also possible to use higher voltage and/or amperage. The power for sensing the capsule may be an AC or a DC power.

BRIEF DESCRIPTION OF THE DRAWINGS

The invention will now be described with reference to the schematic drawings, wherein:

FIGS. 1 to 9 schematically illustrate different configurations of electric connectors associated with a capsule seat of a brewing unit according to the invention;

FIG. 10 illustrates a capsule suitable for such a brewing unit;

FIG. 11 shows a cross-section of a structure of such a brewing unit; and

FIG. 12 schematically illustrates a capsule detecting electric circuit of such a brewing unit.

DETAILED DESCRIPTION

One aspect of the invention relates to a brewing unit of a beverage preparation machine. The brewing unit is configured to operate with capsules containing an ingredient of the beverage to be prepared, e.g. ground coffee or tea or chocolate. A suitable capsule 2 is illustrated in FIG. 10, the structure of a brewing unit 1 suitable for implementing the present invention is illustrated in FIG. 11 and an electric circuit A,Aa, a,B, Bb,b,abc is illustrated in FIG. 12. Various embodiments of electric connections between capsule 2 and electric circuit A,Aa,a,B,Bb,b,abc are illustrated in FIGS. 1 to 9.

In a particular embodiment of the invention, capsule 2 has a generally cup-shaped body 21 and a covering membrane 22. Membrane 22 is assembled to cup 21 along a peripheral rim 24 of cup 21. Rim 24 may be covered with a seal 24', e.g. made of elastomeric material, as will be explained below. Furthermore, capsule 2 in particular rim 24 and/or membrane 22 may bear a ring or toroid 23, e.g. for assisting manufacturing and/or handling of capsule 2. Such capsule 2 forms a packaging for containing an ingredient 20, e.g. ground coffee, of a beverage to be prepared with the beverage preparation machine containing brewing unit 1.

In an embodiment, capsule 2 forms a gastight packaging, e.g. made of aluminium or an aluminium-alloy. Alternatively, the capsule may be more or less pervious, e.g. perforated and/or made of organic, in particular plastic material, e.g. biodegradable material. The capsule's cup 21 and/or the capsule's membrane 22 may be made of a monolithic material, e.g. a metallic material or a conductive ceramic and/or conducive organic material, or may be made of a structure covered or containing a conductive material, e.g. a conductive coating or track, e.g. an aluminium, iron and/or copper coating or track.

Brewing unit 1 forms a seat 11 for holding capsule 2. Moreover, unit 1 comprises a capsule sensing electric circuit with first and second electric connectors A,B and optionally a third connector C.

In accordance with the invention, first electric connector A and second electric connector B are electrically inter-connected through electrically conductive material 21,22,24 of capsule 2 when capsule 2 is present in the seat 11. Connectors A,B,C are electrically disconnected when capsule 2 is not in seat 11. Hence, sensing electric circuit circuit A,Aa,a,B,Bb,b,abc is closed or interrupted depending on the presence or absence, respectively, of capsule 2 in seat 11.

As illustrated in FIG. 12, electric circuit A,Aa,a,B,Bb,b, abc comprises a module abc. Module abc may include a processor or other form of controller connected to an electric sensor of sensing an electric characteristic of the electric circuit. For instance, module abc is arranged for:
detecting a presence of capsule 2 in seat 11 by sensing a voltage and/or a current circulating between the first and second electric connectors A,B; and/or
recognising a capsule type from a plurality of different types of capsules by measuring a type-dependant electric characteristic, such as an impedance e.g. resistance, of capsule 2 when present in the seat 11 and electrically connected to first and second electric connectors A,B.

As mentioned above and illustrated in FIG. 12, electric circuit A,Aa,a,B,Bb,b,abc may comprise a third electric connector C which is electrically connectable to first electric connector A through an electric path AC in the capsule's electrically conductive material 21,22 that is different to an electric path AB in the electrically conductive material 21,24' connecting first and second electric connectors A,B.

As illustrated in FIG. 12, the capsule sensing electric circuit may comprise a control circuit abc that is connected via connectors a,b,c and lines Aa,Bb,Cc to connectors A,B,C associated with seat 11 for coming into contact with capsule 2 when present in seat 11.

At least one of the electric connectors B is arranged to contact a capsule surface made of the electrically conductive material 24' of capsule 2 when present in the seat 11 and to circulate an electric current therethrough. At least one of the electric connectors A,C can be arranged to pierce a capsule surface, in particular a non-conductive surface, to come into contact with the electrically conductive material 21,22 of capsule 2 underneath its surface, when capsule 2 is present in the seat 11, and to circulate an electric current through this conductive material.

For the purpose of exemplification, FIG. 11 illustrates a structure of brewing unit 1 that may be fitted with this capsule sensing electric circuit.

In this particular embodiment, brewing unit 1 comprises first and second enclosing parts 13a,13b delimiting a capsule chamber that forms seat 11. Enclosing parts 13a,13b are movable apart for inserting capsule 2 into seat 11 and/or removing capsule 2 from seat 11 and are movable together to hold capsule 2 in seat 2 for beverage preparation from capsule 2, in particular by circulating a liquid such as water into capsule 2 through ingredient 20 and out of capsule 2.

First and second enclosing parts 13a,13b may be moved together and apart on a frame 18 by actuating pivotable handle 14.

Further constructional details of brewing unit 1 may be found in WO 2009/043630 which is hereby incorporated by way of reference. It is to be noted that other brewing unit structures may be used to implement the present invention, in particular as disclosed EP 1 646 305, EP 1 859 713 and EP 1 859 714.

First and/or second enclosing part(s) 13a,13b may form and/or bear one or more of electric connectors A, B, C.

For instance, first and second enclosing parts 13a,13b are configured to be movable together so as to squeeze therebetween an electrically conductive portion 24,24', such as a tongue or peripheral flange e.g. rim with a seal, of capsule 2 when present in seat 11. Electric connector B can be mounted at rim 111 of enclosing part 13b adjacent squeezed rim 24 with seal 24'. Seal 24' urged between enclosing parts 13a,13b may ensure water-tightness.

Seat 11 may include an upstream capsule piercer 12a and a downstream capsule piercer 12b. For example, upstream piercer is formed of one to three of four water injection blades 12a. Downstream piercer may be made of a surface 12b forming a series of piercing elements such as piercing pyramids that tear open membrane 22. Such piercing element may form one or more electric connectors A,C arranged to be electrically inter-connected by an electrically conductive path AB of capsule 2, when present in the seat 11 and in particular when pierced by the piercer, and to circulate an electric current therethrough. In a variation, downstream piercer 12b may be formed by a non-intrusive extraction surface, i.e. the surface is not arranged to penetrate and/or tear open membrane 22. In this case, membrane 22 may be pre-pierced or may include a self-opening configuration. An electric contact may nevertheless be ensured between membrane 22 and such an extraction surface by urging membrane 22 and the extraction surface. The same principle applies if downstream piercer 12b acts as a delayed opener, i.e. piercer causing opening of membrane 22 only after start-up of beverage preparation, e.g. under the effect of rising pressure in capsule 2 upon injection of pressurised liquid via or along opener 13a.

The beverage preparation machine with such a brewing unit 1 typically includes one or more of the following components:
a) brewing unit 1, for holding in a beverage preparation configuration a capsule 2 containing a flavouring ingredient 20 and for guiding an incoming flow of liquid, such as water, through this ingredient to a beverage outlet 15;
b) an in-line heater 16, such as a thermoblock, for heating this flow of liquid to be supplied to capsule seat 11 of brewing unit 1 via a fluid connector 17;
c) a pump for pumping liquid through in-line heater 16;
d) one or more fluid connecting members for guiding liquid from a source of liquid, such as a tank of liquid, to beverage outlet 15;

e) an electric control unit abc, in particular comprising a printed circuit board (PCB), for receiving instructions from a user via an interface and for controlling in-line heater 16 and the pump; and f) one or more electric sensors for sensing at least one operational characteristic selected from characteristics of seat 11, in-line heater 16, the pump, the liquid reservoir, a used capsule collector, a flow of liquid, a pressure of liquid and a temperature of liquid, and for communicating such characteristic(s) to the control unit.

Heater 16 may be a thermoblock or an on demand heater (ODH), for instance an ODH type disclosed in EP 1 253 844, EP 1 380 243 and EP 1 809 151. Examples of suitable brewing units and capsule management are for example disclosed in WO 2005/004683, WO2007/135136 and WO 2009/043630, which are hereby incorporated by way of reference. Suitable beverage preparation modules are for instance disclosed in WO 2009/074550 and WO 2009/130099, which are hereby incorporated by way of reference.

Different configurations of electric connectors A,B,C relative to seat 11 are illustrated in FIGS. 1 to 9.

FIG. 1 illustrates an embodiment with two electric connectors A1,B1 in seat 11 of brewing unit 1. Connectors A1,B1 are arranged to come into contact with cup 21 of capsule 2. Typically, connectors A1,B1 are formed by a pair of piercing elements 12a that open an upstream part of capsule 2 for injecting water into capsule 2. In this case, the electric path in capsule 2 joining connectors A1,B1 may extend along a bottom (upstream part) of cup 21.

FIG. 2 illustrates another embodiment of the invention in which a first connector A2 is arranged to come into contact with cup 21 of capsule 2, e.g. by piercing, and a second connector B2 is arranged to come into contact with capsule ring 23, typically a part of capsule 2 that extends outside seat 11. For instance, connector B2 is formed by support 151 of part 13b in FIG. 11. In this case, capsule 2 should comprise the electrically conductive material at least in a central part of the bottom of cup 21, extend therefrom along the sidewalls of cup 21 and cross peripheral rim 24 to reach ring 23 that is made of electrically conductive material. It should be noted that cup 21 and/or peripheral rim 24 may be made of electrically conductive material or may merely bear conductive tracks in or on a non-conductive structure forming these parts. Moreover, peripheral ring 23 may be made of electrically conductive material generally along its entire periphery or may be made of an electrically non-conductive structure bearing a track of conductive material, e.g. radially extending from peripheral rim 24. In the latter case, connector B2 may be ring-shaped and extend over a substantial part or the entire periphery of ring 23 to intercept the conductive radial track. In the former case, connector B2 may be a point connector contacting any point of conductive ring 23.

FIG. 3 illustrates a further embodiment in which both connectors A3,B3 come into contact with ring 23 of capsule 2 at spaced apart locations, e.g. opposite locations. In this case, the conductive path between the connectors A3,B4 can extend generally across membrane 22, if conductive, or along rim 24 and/or ring 23 if membrane is non-conductive or significantly less conductive than rim 24 and/or ring 23.

FIG. 4 shows an embodiment in which connectors A4,B4 come into contact with capsule rim 24, in particular a sealing element 24 of capsule 2. In this configuration, the conductive path between the connectors A4,B4 may extend generally across membrane 22, if conductive, or along rim 24 and/or ring 23 if membrane 22 is non-conductive or poorly conductive.

FIG. 5 illustrates a further embodiment in which connectors A5,B5 come into contact with capsule cup 21 and membrane 22. In this configuration, the conductive path between the connectors A5,B5 may extend generally along capsule cup 21 and membrane 22. In a variation, the conductive path may be formed by a conductive wire, indicated by dotted line 25, extending through capsule 2 between connectors A5,B5.

FIG. 6 illustrates yet another embodiment, similar to the embodiment of FIG. 3, in which connectors A5,B5 come into contact with rim 24 at the periphery of membrane 22. In this configuration, the conductive path between connectors A6,B6 may extend through membrane 22.

FIG. 7 shows a variation of the embodiment of FIG. 2, in which second connector B7 contacts a sealing member formed on rim 24 for sealing off seat 11 around capsule 2 when brewing unit 1 is closed.

FIG. 8 shows a yet further embodiment in which first connector A8 is located on sealing member 24' on rim 24 and second connector B8 is located on rim 24 itself. For instance, rim 24 is a metallic peripheral extension of membrane 22 and sealing member 24' an elastomeric ring loaded with conductive material such as metallic particles. Moreover, first and second connectors A8,B8 may be elastically constrained towards each other so as to touch each other, and be in electrical contact, when enclosing parts 13a,13b are together. When enclosing parts 13a,13b are spaced apart (open) first and second connectors A8,B8 are not touching each other and not in electric direct contact. This configuration permits several level of sensing.

The lack of electric contact between connectors A8,B8 indicates that enclosing parts 13a,13b are spaced apart and that brewing unit 1 is open. In this case, injection of liquid into seat 11 can be blocked for safety and/or hygiene reasons and/or the machine may be run down into an economy mode at reduced energy consumption. When electric contact between connectors A8,B8 is detected, it means that the enclosing parts 13a,13b are closed. If the voltage drop between connectors A8,B8 is very low, e.g. close to zero, it means that no capsule is present in seat 11. In this latter case, beverage preparation may be blocked however service modes, such as rinsing and/or descaling, may be allowed. When the voltage drop is at an intermediate level, between the maximum voltage drop when the enclosing parts 13a,13b are spaced apart and the minimum voltage drop when the enclosing parts 13a,13b are closed without any capsule 2 in-between, its means that a capsule 2 is present in seat 2 with rim 24 and seal 24' connecting connectors A8,B8. In this latter case, beverage preparation may be allowed. In a more advanced configuration, the electric circuit may be arranged to sense several intermediate voltage drops corresponding to different levels of resistivity of rim 24 and seal 24' that are type-dependant. In other words, the type of capsule may be derived from the intermediate voltage drop and the beverage preparation process may be adjusted accordingly in an automatic manner.

FIG. 9 illustrates an embodiment with three connectors A9,B9,C9 that is equivalent to the embodiment shown in FIG. 12 and that combines the electric contact configurations A5(=A7),B5,B7 of the embodiments shown in FIGS. 5 and 7.

In all these embodiments, the electric characteristics of capsules 2 may be used to: detect a presence or absence of capsule 2 in seat 11; and/or to identify a type of a capsule 2 in seat 11 selected from a plurality of different capsule types.

In the latter case, the electric characteristic of one type of capsules 2 is different to another type of capsules 2. For instance, the impedance, in particular the resistivity of the conductive paths AB,AC through the capsules may differ between the capsule types. For example, the geometry of the conductive path is changed and/or the electric material carrying the electric path is changed from one type to another type so as to provide a differentiating electric marking for each capsule type.

In one embodiment, different types of capsules 2 have all the same electric characteristics with respect to their capsule cup 21 and membrane 22. However, capsule rims 24 bear sealing members that have type-dedicated electric properties, in particular a type-dedicated resistivity. For example, these sealing members are made of rubber material that is loaded with conductive particles. The amount and/or nature of the conductive particles, e.g. copper, iron and/or aluminium particles, are different for the different capsule types to allow their automatic identification by measuring their resistivity.

As mentioned above, the seal at rim 24 may be used to seal seat 11 around capsule 2 between enclosing part 13a,13b of brewing unit 1. A suitable implementation of such seals on capsules and their (mechanical) interaction with the seat can be found in EP 1 654 966, the content of which is hereby incorporated by way of reference.

During use, e.g. of the configuration shown in FIG. 12, the electric circuit A,Aa,a,B,Bb,b,abc is put under power, e.g. a voltage is applied between connectors A,B,C. By measuring the current passed from connector A to connector B and from connector A to connector C, the presence of a capsule with electrically conductive paths AB,AC can be derived from the existence of a circulating current that is greater than zero (i.e. the electric circuit is closed between connectors A,B,C by the presence of capsule 2) and/or the type-dedicated resistivity of the paths AB,AC can be derived by measuring the level of the current passed and dividing the voltage by the measured current.

Control unit abc may be programmed to run down automatically the beverage preparation machine into an energy saving mode in the absence of a capsule 2 in seat 11, for instance by shutting-off an energy consuming user-interface or a heat-accumulation heater 16. The absence of a capsule 2 in seat 11 may also allow a service mode, e.g. the user may be allowed to request the carrying out of a cleaning and/or rinsing process.

Moreover, control unit abc may be programmed to carry out automatically different beverage preparation processes depending on the type of a capsule identified by the system. For instance, the amount and/or the temperature of water circulated through the capsules may be adjusted for each type of capsules.

If appropriate, the control unit abc may be deactivated by by-passing the connectors A,B,C. Such a by-pass may be "virtual", for example by programming control unit abc, e.g. a user may request via an appropriate user-interface deactivation of the system or an after-sale service may reprogram control unit abc for such a purpose. By-passing connectors A,B,C may also be achieved physically, e.g. by inserting a by-pass S1,S2 between connectors A,B,C. Such a by-pass S1,S2 may be made of an appropriate electric conductor that is associated with seat 11 such as to simulate the presence of a conductive capsule 2. Such conductors S1,S2, e.g. an electric conductive track inserted into seat 11 and following the walls of seat 11, should be sufficiently small to leave sufficient unoccupied space in seat 11 for inserting a capsule therein of the same or similar size as conductive capsule 2 or of a smaller size to account for the space occupation of a "larger" by-pass.

The invention claimed is:

1. A brewing unit of a beverage preparation machine, the brewing unit comprising:

a seat for holding a capsule comprising an electrically conductive material; and a capsule sensing electric circuit with first and second electric connectors, the first electric connector and the second electric connector are:

electrically connected through the electrically conductive material of the capsule when the capsule is present in the seat, at least one of the electric connectors is arranged to contact a capsule surface made of the electrically conductive material of the capsule when the capsule is present in the seat and to circulate an electric current therethrough; and electrically disconnected when the capsule is not in the seat and/or when the seat is in an open configuration for receiving and/or evacuating a capsule, so as to close and interrupt, respectively, the capsule sensing electric circuit.

2. A method of operating a brewing unit of a beverage preparation machine, the brewing unit comprising (i) a seat for holding a capsule comprising an electrically conductive material and (ii) a capsule sensing electric circuit with first and second electric connectors, the first electric connector and the second electric connector are electrically connected through the electrically conductive material of the capsule when the capsule is present in the seat, and electrically disconnected when the capsule is not in the seat and/or when the seat is in an open configuration for receiving and/or evacuating a capsule, so as to close and interrupt, respectively, the capsule sensing electric circuit, the method comprising:

powering an electric circuit and measuring at least one electric characteristic selected from the group consisting of a circulating current between the first and second electric connectors, a voltage drop between the first and second electric connectors, and combinations thereof.

3. A method for using a capsule having an electrically conductive material for connecting electrically the electric connectors of a brewing unit of a beverage preparation machine, the brewing unit comprising (i) a seat for holding the capsule comprising an electrically conductive material and (ii) a capsule sensing electric circuit with first and second electric connectors, the first electric connector and the second electric connector are electrically connected through the electrically conductive material of the capsule when the capsule is present in the seat, and electrically disconnected when the capsule is not in the seat and/or when the seat is in an open configuration for receiving and/or evacuating a capsule, so as to close and interrupt, respectively, the capsule sensing electric circuit, the method comprising inserting the capsule so that the capsule is held in the seat and brewing a beverage.

4. A capsule for a brewing unit of a beverage preparation machine, the brewing unit comprising (i) a seat for holding a capsule comprising an electrically conductive material and (ii) a capsule sensing electric circuit with first and second electric connectors, the first electric connector and the second electric connector are electrically connected through the electrically conductive material of the capsule when the capsule is present in the seat, and electrically disconnected when the capsule is not in the seat and/or when the seat is in an open configuration for receiving and/or evacuating a capsule, so as to close and interrupt, respectively, the capsule sensing electric circuit, the capsule comprising:

a non-conductive structure; and a track made of the electrically conductive material supported by the structure for electrically connecting said first and second electric connectors.

5. A set of capsules for a brewing unit of a beverage preparation machine, the brewing unit comprising (i) a seat for holding a capsule comprising an electrically conductive material and (ii) a capsule sensing electric circuit with first and second electric connectors, the first electric connector and the second electric connector are electrically connected through the electrically conductive material of the capsule when the capsule is present in the seat, and electrically disconnected when the capsule is not in the seat and/or when the seat is in an open configuration for receiving and/or evacuating a capsule, so as to close and interrupt, respectively, the capsule sensing electric circuit, the capsules comprising:
  an electrically conductive material and differing from each other by at least one electric characteristic of the electrically conductive material of each capsule.

6. A brewing unit of a beverage preparation machine, the brewing unit comprising:
  a seat for holding a capsule comprising an electrically conductive material; and
  a capsule sensing electric circuit with first and second electric connectors, the first electric connector and the second electric connector are:
    electrically connected through the electrically conductive material of the capsule when the capsule is present in the seat; and
    electrically disconnected when the capsule is not in the seat and/or when the seat is in an open configuration for receiving and/or evacuating a capsule, so as to close and interrupt, respectively, the capsule sensing electric circuit,
    wherein the electric circuit comprises a module for detecting a presence of the capsule in the seat by sensing a voltage and/or a current circulating between the first and second electric connectors.

7. A brewing unit of a beverage preparation machine, the brewing unit comprising:
  a seat for holding a capsule comprising an electrically conductive material; and
  a capsule sensing electric circuit with first and second electric connectors, the first electric connector and the second electric connector are:
    electrically connected through the electrically conductive material of the capsule when the capsule is present in the seat; and
    electrically disconnected when the capsule is not in the seat and/or when the seat is in an open configuration for receiving and/or evacuating a capsule, so as to close and interrupt, respectively, the capsule sensing electric circuit,
    wherein the electric circuit comprises a third electric connector that is electrically connectable to the first electric connector through an electric path in the electrically conductive material of the capsule that is different to an electric path in the electrically conductive material connecting the first and second electric connectors.

8. A brewing unit of a beverage preparation machine, the brewing unit comprising:
  a seat for holding a capsule comprising an electrically conductive material; and
  a capsule sensing electric circuit with first and second electric connectors, the first electric connector and the second electric connector are:
    electrically connected through the electrically conductive material of the capsule when the capsule is present in the seat; and
    electrically disconnected when the capsule is not in the seat and/or when the seat is in an open configuration for receiving and/or evacuating a capsule, so as to close and interrupt, respectively, the capsule sensing electric circuit,
    wherein at least one of the electric connectors is arranged to pierce a capsule surface, to come into contact with the electrically conductive material of the capsule underneath its surface, when the capsule is present in the seat, and to circulate an electric current through the conductive material.

9. A brewing unit of a beverage preparation machine, the brewing unit comprising:
  first and second enclosing parts defining a capsule chamber that forms a seat for holding a capsule, the first and second enclosing parts being movable together to hold the capsule in the seat for beverage preparation from the capsule, which comprises an electrically conductive material; and
  a capsule sensing electric circuit with first and second electric connectors, the first electric connector and the second electric connector are:
    electrically connected through the electrically conductive material of the capsule when the capsule is present in the seat; and
    electrically disconnected when the capsule is not in the seat and/or when the seat is in an open configuration for receiving and/or evacuating a capsule, so as to close and interrupt, respectively, the capsule sensing electric circuit.

10. The unit of claim 9, the first and the second enclosing parts form an electric connector.

11. The unit of claim 10, the first and second enclosing parts being configured to be movable together so as to squeeze therebetween an electrically conductive portion of the capsule when the capsule is present in the seat, and at least one of the electric connectors being mounted in and/or adjacent one of the enclosing parts adjacent to the squeezed portion.

12. A brewing unit of a beverage preparation machine, the brewing unit comprising:
  a seat for holding a capsule comprising an electrically conductive material; and
  a capsule sensing electric circuit with first and second electric connectors, the first electric connector and the second electric connector are:
    electrically connected through the electrically conductive material of the capsule when the capsule is present in the seat;
    electrically disconnected when the capsule is not in the seat and/or when the seat is in an open configuration for receiving and/or evacuating a capsule, so as to close and interrupt, respectively, the capsule sensing electric circuit; and
    arranged to (i) electrically contact each other in the absence of any capsule in the seat that is in a closed configuration, and (ii) be out of electrical contact when the seat is in an open capsule receiving and/or evacuation configuration.

13. A brewing unit of a beverage preparation machine, the brewing unit comprising:
  a seat for holding a capsule comprising an electrically conductive material; and
  a capsule sensing electric circuit with first and second electric connectors, the first electric connector and the second electric connector are:
    electrically connected through the electrically conductive material of the capsule when the capsule is present in the seat; and electrically disconnected when the capsule is not in the seat and/or when the seat is in an open configuration for receiving and/or evacuating a capsule, so as to close and interrupt, respectively, the capsule sensing electric circuit, wherein the seat comprises a capsule piercer forming a series of piercing elements, the capsule piercer forming one of the electric connectors which is arranged to be in contact with an electrically conductive portion of the capsule, when present in the seat and to circulate an electric current therethrough.

14. A method of deactivating an electric circuit of a brewing unit of a beverage preparation machine, the brewing unit comprising (i) a seat for holding a capsule comprising an electrically conductive material and (ii) a capsule sensing electric circuit with first and second electric connectors, the first electric connector and the second electric connector are electrically connected through the electrically conductive material of the capsule when the capsule is present in the seat, and electrically disconnected when the capsule is not in the seat and/or when the seat is in an open configuration for receiving and/or evacuating a capsule, so as to close and interrupt, respectively, the capsule sensing electric circuit, the method comprising electrically connecting the electric connectors with a bypass, the conductor being arranged to extend along a peripheral part of the seat so as to leave sufficient room in the seat for inserting a separate capsule.

15. A brewing unit of a beverage preparation machine, the brewing unit comprising:

a seat for holding a capsule comprising an electrically conductive material; and a capsule sensing electric circuit with first and second electric connectors, the first electric connector and the second electric connector are:

electrically connected through the electrically conductive material of the capsule when the capsule is present in the seat; and electrically disconnected when the capsule is not in the seat and/or when the seat is in an open configuration for receiving and/or evacuating a capsule, so as to close and interrupt, respectively, the capsule sensing electric circuit, wherein the electric circuit comprises a module for recognizing a capsule type from a plurality of different types of capsules by measuring a type-dependent electric characteristic of the capsule when present in the seat and electrically connected to the first and second electric connectors.

16. A method of operating a brewing unit of a beverage preparation machine, the brewing unit comprising (i) a seat for holding a capsule comprising an electrically conductive material and (ii) a capsule sensing electric circuit with first and second electric connectors, the first electric connector and the second electric connector are electrically connected through the electrically conductive material of the capsule when the capsule is present in the seat, and electrically disconnected when the capsule is not in the seat and/or when the seat is in an open configuration for receiving and/or evacuating a capsule, so as to close and interrupt, respectively, the capsule sensing electric circuit, the method comprising:

powering an electric circuit and measuring at least one electric characteristic selected from the group consisting of a circulating current between the first and second electric connectors, a voltage drop between the first and second electric connectors, and combinations thereof; and deriving from the at least one electric characteristic at least one of:

a presence or an absence in the seat of a capsule that comprises an electrically conductive material connected to and connecting the connectors by forming therebetween an electrically conductive path;

an open configuration of the seat for receiving and/or evacuating a capsule; and a capsule type selected from a plurality of different types of capsules comprising an electrically conductive material having a type-dependent electric characteristic measurable by the electric circuit when a capsule of one of the types is present in the seat.

* * * * *